United States Patent Office 3,530,128
Patented Sept. 22, 1970

3,530,128
PROCESS FOR THE PREPARATION OF TETRA-HYDRO-5-HYDROXY-2(1H)-PYRIMIDONE
Leonard Levine, Lake Jackson, Tex., assignor to The Dow Chemical Company, Midland, Mich., a corporation of Delaware
No Drawing. Filed Oct. 7, 1968, Ser. No. 765,658
Int. Cl. C07d 51/28
U.S. Cl. 260—251                  8 Claims

ABSTRACT OF THE DISCLOSURE

Tetrahydro - 5 - hydroxy - 2(1H) - pyrimidone is prepared by reacting a cyclic alkylene carbonate with 1,3-diamino-2-propanol.

BACKGROUND OF THE INVENTION

Tetrahydro - 5- hydroxy - 2(1H) - pyrimidone has been made by the condensation of 1,3-diamino-2-propanol with urea as taught by U.S. Pat. 3,158,501 or with 1-amino-2-alkyl carbamate as taught by U.S. Pat. 2,937,174.

SUMMARY OF THE INVENTION

The process of the invention entails the reaction of a cyclic alkylene carbonate with 1,3-diamino-2-propanol to produce tetrahydro-5-hydoxy-2(1H)-pyrimidone.

In the process of the invention, cyclic alkylene carbonates containing 3 to 10 or more carbon atoms may be used. Alkylene carbonates containing 5- or 6-member rings are preferred for the reaction. Thus, the vicinal alkylene carbonates, such as ethylene carbonate, 1,2-propylene carbonate, 1,2- or 2,3-butylene carbonate, 2-ethyl-1,2-butylene carbonate, 1,2-amylene carbonate, 4,5-octylene carbonate, and 1,2-hexylene carbonate may be used. Non-vicinal alkylene carbonates such as 1,3-propylene carbonate, 1,3-butylene carbonate, 2-methyl-1,3-butylene carbonate, 2-ethyl-1,3-propylene carbonate, 2-ethyl-1,3-pentylene carbonate, 1,3-hexylene carbonate, and 4,6-nonylene carbonate may be used as well in the reaction.

Equivalent molar quantities of the cyclic alkylene carbonate and 1,3-diamino-2-propanol are preferred, but a substantial excess of the diamine may be used. For the best results, however, a substantial excess of the alkylene carbonate should be avoided.

The process of the invention is preferably conducted in the liquid phase. A solvent, such as water, ethanol or dioxane, may be used. The reactants without a solvent may be heated above the melting point to liquefy the mixture.

In the preferred process of the invention 1,3-diamino-2-propanol is dissolved in water at about room temperature and a stoichiometric amount of cyclic alkylene carbonate is then gradually added to the solution. After all the alkylene carbonate has been added, the temperature of the reaction mixture may be raised to 40° to 50° C. for a few hours. The glycol formed by the reaction of the cyclic carbonate may then be distilled off under a vacuum until the product crystallizes.

The temperatures used in the process of the invention may suitably range from 0° to 150° C. Temperatures from 10° to 70° C. are preferred.

After the reaction has occurred, the product is isolated in any convenient manner. In a preferred procedure, the glycol produced by the reaction is distilled. This is most conveniently done at reduced pressure. As the distillation proceeds, crystals are formed in the distillation flask. These crystals may be recovered at the distillation temperature, or the residue may be cooled to obtain additional crystals.

SPECIFIC EMBODIMENTS

Example 1

Tetrahydro - 5 - hydoxy - 2(1H) - pyrimidone is prepared by the following equation:

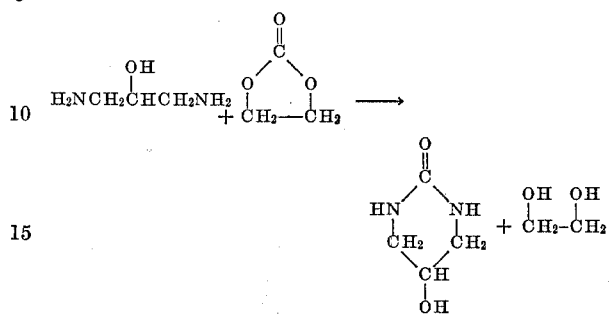

A solution composed of 95 grams (1.05 mole) of 1,3-diamino-2-propanol and 50 ml. of water was cooled to 15° C. To this solution, 88 grams (1.0 mole) of molten ethylene carbonate was added dropwise with stirring, while maintaining the temperature at 15° to 20° C. The resulting mixture was then reacted at 40° to 45° C. for three hours.

Then the reaction mixture was subjected to vacuum distillation. Ethylene glycol (B.P., 61°/63 mm.) was recovered. When 32 ml. had been distilled, solids began to precipitate in the distallation flask. The distillation was terminated, and a white crysalline solid melting at 212° to 214° C. was filtered from the residue. Additional product was precipitated from the filtrate on cooling. A total of 34 grams (29.3% of the theoretical) was collected. A sample recrystallized from butanol melted at 213° to 214.5° C. The literature gives a melting range of 210° to 211° C. (J.A.C.S. 72, 3205–6, 1950).

Example 2

By the process of Example 1, 1,3-diamino-2-propanol is reacted with 1,3-propylene carbonate to produce tetrahydro-5-hydroxy-2(1H)-pyrimidone.

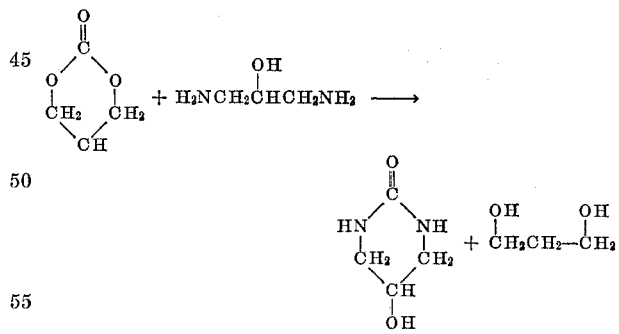

I claim:
1. The process for preparing tetrahydro-5-hydroxy-2 (1H)-pyrimidone comprising reacting by contacting 1,3-diamino-2-propanol with a 5- or 6-member ring cyclic alkylene carbonate.
2. The process defined in claim 1 wherein the cyclic alkylene carbonate contains 3 to 10 carbon atoms.
3. The process defined in claim 2 wherein the alkylene group of the cyclic alkylene carbonate is a vicinal alkylene group.
4. The process defined in claim 1 wherein the molar amount of the diamine is at least equal to that of the cyclic alkylene carbonate.
5. The process defined in claim 1 wherein the temperature is 0° to 150° C.

6. The process defined in claim 1 wherein the glycol produced by the reaction is separated from the reaction mixture.

7. The process defined in claim 1 wherein the alkylene carbonate is ethylene carbonate.

8. The process defined in claim 7 wherein ethylene glycol is distilled from the reaction mixture so that tetrahydro-5-hydroxy-2(1H)-pyrimidone is crystallized.

References Cited

FOREIGN PATENTS 1,093,807   12/1967   Great Britain.

ALEX MAZEL, Primary Examiner

R. V. RUSH, Assistant Examiner